United States Patent [19]
Proctor, Jr. et al.

[11] Patent Number: 5,687,196
[45] Date of Patent: Nov. 11, 1997

[54] RANGE AND BEARING TRACKING SYSTEM WITH MULTIPATH REJECTION

[75] Inventors: James Arthur Proctor, Jr., Indialantic; James Carl Otto, Indian Harbour Beach, both of Fla.

[73] Assignee: Harris Corporation, Melbourne, Fla.

[21] Appl. No.: 315,345

[22] Filed: Sep. 30, 1994

[51] Int. Cl.[6] .................... H04B 7/10; H04L 1/02
[52] U.S. Cl. .................... 375/347; 342/457; 342/463; 455/132
[58] Field of Search .................... 375/200, 209, 375/343, 346, 348, 349, 347, 367; 342/417, 421, 423, 450, 463; 455/65, 132

[56] References Cited

U.S. PATENT DOCUMENTS

| | | | |
|---|---|---|---|
| 4,443,801 | 4/1984 | Klose et al. | 343/242 |
| 4,752,969 | 6/1988 | Rilling | 455/278 |
| 5,260,711 | 11/1993 | Sterzer | 342/375 |
| 5,296,861 | 3/1994 | Knight | 342/357 |
| 5,402,450 | 3/1995 | Lennen | 375/343 |
| 5,548,296 | 8/1996 | Matsuno | 342/457 |
| 5,596,330 | 1/1997 | Yokev et al. | 342/387 |

Primary Examiner—Tesfaldet Bocure
Assistant Examiner—Bryan Webster
Attorney, Agent, or Firm—Rogers & Killeen

[57] ABSTRACT

A system and method for tracking a remote RF transmitter with reduced susceptibility to the effects of multipath in which the distance and direction of an arriving RF chirp signal are determined with respect to the earliest arriving portion of the signal which is presumed to be the direct path signal. The received chirp signals, including the direct and multipath signals, from a remote transmitter are correlated into plural path signals, and the direction and distance to the transmitter is determined from the earliest arriving path signal.

32 Claims, 2 Drawing Sheets

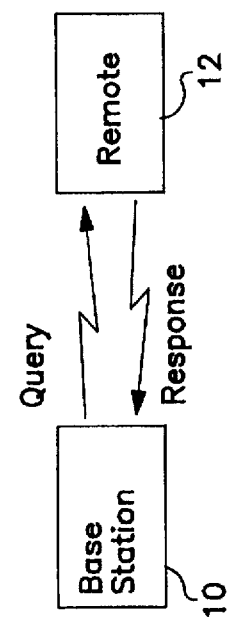
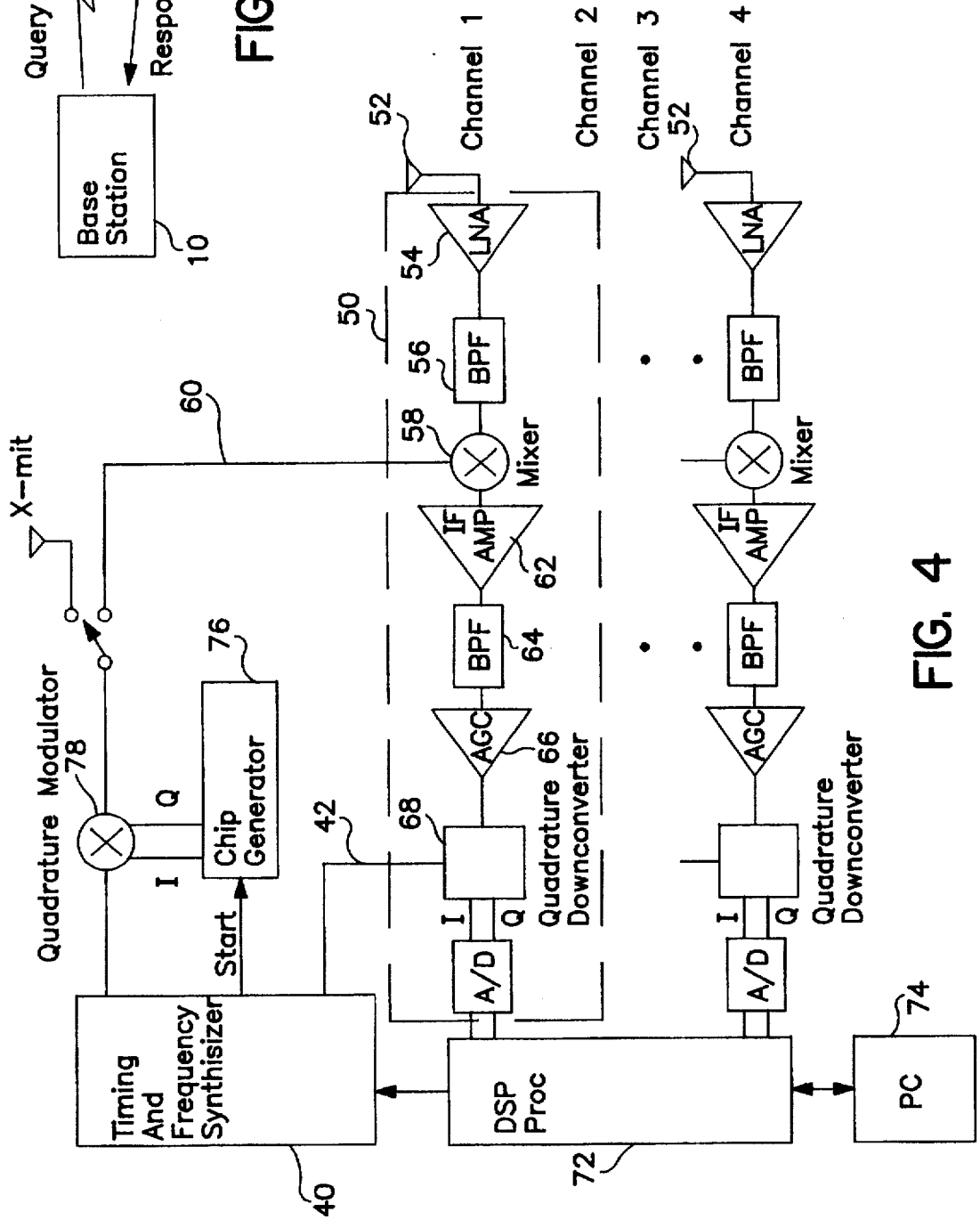

RANGE AND BEARING TRACKING SYSTEM WITH MULTIPATH REJECTION

BACKGROUND OF THE INVENTION

The present invention is related generally to systems and methods for determining the range and bearing of the source of radiofrequency ("RF") signal and, in particular, to systems and methods for determining the range and bearing of such signals in the face of multipath and similar noise sources.

Systems and method for determining the distance and bearing of an RF signal are well known. In some systems, a outbound signal having a known power is sent from a base station to a remote station at an unknown location. The remote station may "respond" to the signal from the base station by returning a signal upon receipt of the outbound signal. Such a system is presently produced by Cubic Defense Systems, Inc. as the AN/ARS-6(V) PLS system or by Rockwell International Inc as the Target Locating System (TLS). The distance between the base station and the remote station may be determined by any of the known methods. For example, the distance can be computed by timing the total transit time between the transmission of the outbound signal and the receipt of the response signal. By subtracting the estimated time of the delay in the remote station from the total transit time, the time to traverse twice the distance between the base and the remote stations can obtained and the distance readily computed. By way of another example of prior art systems, the distance between the base and the remote stations can be estimated by knowing the power of the signal transmitted from the remote and measuring the power of the signal received at the base station. Using the inverse square law of signal strength over increasing distances, an estimate of the distance can be obtained from the difference between the transmitted power and the received power.

Likewise, it is known in the prior art to determine the direction of the response signal by one of many techniques. For example, in one of the most simple methods, a loop antenna may be rotated and the strength of the response signal measured. The transmitting station is estimated to be along the line corresponding to the axis of the loop when the loop is position to maximize response signal power. In another example in the prior art, a base station may use plural antennas having a known geometric relationship to one another. The angle of arrival of the response signal may be determined by evaluating the phase of the response signal simultaneously at each of the antennas. The simultaneous phase relationships at the antennas, the geometric relationship of the antennas and the frequency of the response signal can be used to estimate the angle of arrival of the response signal with respect to the antennas.

All of the above-noted systems and methods for determining range and bearing in the prior art experience some difficulty in multipath and other noisy environments typical of where many such tracking and ranging systems are used. For example, with reference to FIG. 1, an RF signal source 10 may be located at location remote and unknown to a base station 12. Plural blocking and/or reflecting elements 14, such as buildings, towers, mountains may exist in the proximity of and in the direct path between the RF signal source 10 and the base station 12. The blocking and/or reflecting elements cause RF signals impinging upon such elements to be blocked, absorbed, reflected, and often a combination of all three. Generally, such elements cause RF signals to be diminished in strength and to change direction.

When a source of RF signals such as the remote source 10 radiates RF signals, such signals are blocked and/or reflected by the elements 14 such that instead of a single signal arriving at the base station 12, multiple versions of the same or slightly altered signal arrive at the base station 12. The different versions of the signals arrive at different times because they have travelled different paths of different distances than either the direct version or other indirect versions. The signals may also be altered from one another because each of the signals has experienced a different environment and may have been subject to different noise and interference sources along the different paths.

With continued reference to FIG. 1, in a multipath environment, the signal which arrives directly from the RF signal source 10 at the base station 12 may not be the strongest signal. For example, in the system of FIG. 1 three different paths 20, 22, and 24 between the RF signal source 10 and the base station 12 are shown. (It being understood that generally communications are conducted across an arc and not just at selected lines from the RF signal source.) The first signal path 20 proceeds directly from the RF signal source 10 to the base station 12. Because the first signal path intersects two of the elements, and each element tends to diminish the strength of the signal, the signal arriving at the base station 12 is lower in amplitude or power than a signal arriving without being partially absorbed. Note that when the signal on the first signal path impinged on the elements, it is likely that some portion of the signal was reflected and some portion was refracted and never reached the base station 12 but such reflection and refraction are not shown with respect to the first signal path 20 for simplicity of illustration.

The second signal path 22 in the illustration of FIG. 1 is reflected off two of the elements 14 before reaching the base station 12 (refraction and absorption not being shown). If the reflecting surfaces of these two elements are relatively efficient, a relatively strong signal will reach the base station 12 along the second signal path 22. Because the signal travelling the second signal path 22 travelled a longer distance than the signal travelling the first signal path 20, the signal on the second path will arrive at the base station 12 after the signal on the first signal path 20. Similarly, the third signal path 24 is reflected off an element 14 to reach the base station 12.

Note that in the system of FIG. 1, the various signals arrive at the base station from entirely different angles. In some systems in the prior art, the locating system will operate on the signal having the strongest signal power. As can be seen from the illustration in FIG. 1, such a procedure will lead to an erroneous result as the signal with the strongest power arrives along the second signal path 22, from almost the very opposite of the actual angle to the RF signal source. Note also that if ranging is done on the basis of the strongest signal, the ranging determination will be in error because the strongest (second signal path 22) travels more distance than the distance between the RF signal source 10 and the base station 12.

The influences of multipath signals on distance and angle location has been recognized in the prior art. Some prior art systems ignore the influence of multipath by utilizing a composite signal based on the strengths of the various multipath signals identified by the base station 12 The systems of FIG. 1 illustrate how the composite signal may be erroneous as signal which is the composite of the arriving signals may yield a signal which is misaligned such as the composite signal 26. As can be seen from the illustration, the direct signal path (first signal path 20) will yield the best "direction" information but the "composite" signal 26 received by the base station is a combination of signals from different angles of arrival.

It is accordingly an object of the present invention to provide a novel system and method of tracking a remote RF transmitter which obviates these and other known problems in the prior art.

It is a further object of the present invention to provide a novel system and method of tracking a remote RF transmitter which has a reduced susceptibility to the effects of multipath.

It is another object of the present invention to provide a novel system and method of tracking a remote RF transmitter by determining the range and direction of an arriving signal with respect to the portion of the signal arriving directly from the RF transmitter.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3 is a simplified block diagram of a system in which the present invention may be used.

FIG. 4 is a simplified block diagram of another embodiment of a device in which the method of the present invention can be implemented.

DESCRIPTION OF PREFERRED EMBODIMENTS

Figure 1:
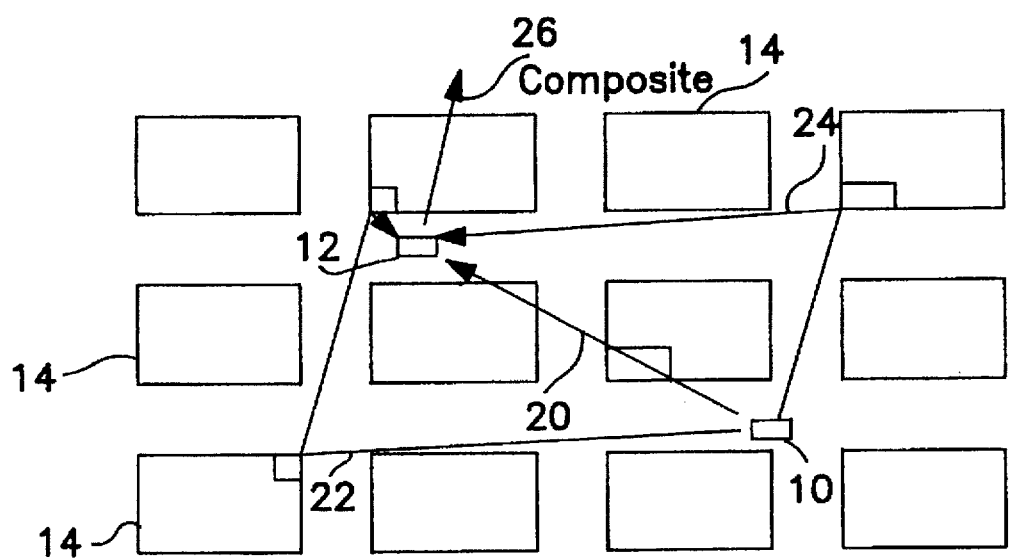
FIG. 1 is a pictorial representation of a typical environment in which RF tracking is accomplished, showing the various signal paths.
Figure 2:
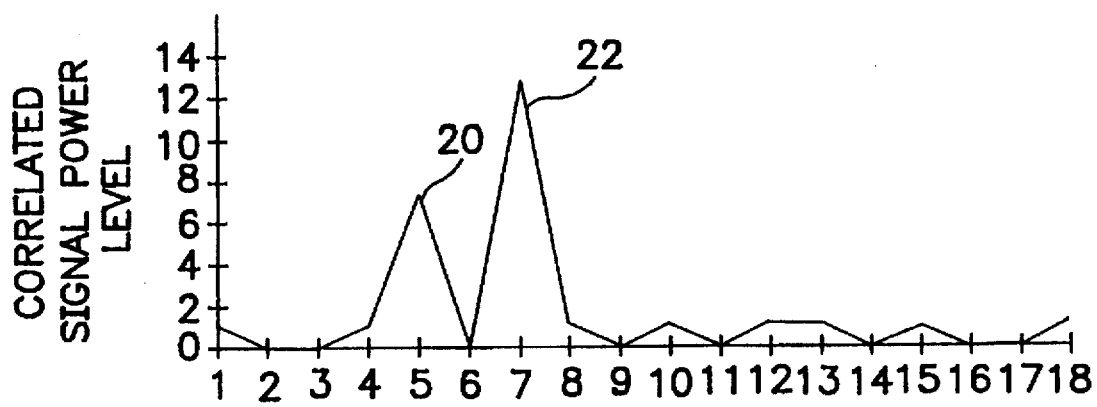
FIG. 2 is a signal power level graph showing the correlations of signal power in a typical multipath signal.

The principles of operation of the present invention can be described with reference to the correlated signal power level graph of FIG. 2. The graph of FIG. 2 depicts the correlated power level of the signal received plotted against time starting from the time of transmission of the signal. In a typical multipath environment, such as shown in the illustration of FIG. 1, the signal power level may have several peaks, each peak corresponding to the arrival of a signal which has taken a different route. For example, in FIG. 2, the first peak could correspond to the signal traveling along the first signal path 20 of FIG. 1, the second peak could correspond to the signal travelling along the second signal path 22 of FIG. 1, et cetera. Note that in the graph of FIG. 2, the "strongest" signal corresponds to the signal travelling on the second signal path 22 and that this is a multipath signal, not the signal arriving directly from the transmitter. Rather, the signal arriving directly from the transmitter is the first signal having a significant peak, the signal travelling along the first signal path 20. The first arriving signal in this example is weaker than the later arriving signal because the signal was attenuated by passing through the blocking elements 14 illustrated in FIG. 1. Because the "shortest distance between two points is a straight line" and the speed of transmission of the signal through various media is approximately equal, the signal travelling directly from the transmitter to the base station will always be the first signal to arrive (assuming that the signal is not wholly blocked.) The present invention takes advantage of the fact that the first arriving signal is the signal which has travelled the shortest distance and is most likely the signal corresponding to the direct path to the transmitter by selecting this signal from which to determine the range to and angle of arrival from the remote transmitter.

With reference to FIG. 3, the present invention may be embodied in a tracking and locating system in which a base station 10 transmits a signal to a remote unit 12 which relays the signal back to the base station 10. The signal may be a spread spectrum signal, such as a chirp signal. By determining the round trip time and subtracting the known delay within the remote unit 12 and within the base station's detection system, the propagation time is determined and the distance may be calculated. In a preferred embodiment, the base station's receiver is a conventional correlation receiver in which the power level of the arriving signal is correlated in time and the signal arriving first in time is used to determine the total propagation time and angle of arrival.

With reference to FIG. 4, the present invention may be embodied in a direction finding unit having multiple channels 50, each channel being associated with a different antenna 52 (or dement in a plural element antenna array). The geometric relationship of the plural antennas 52 is known to the DF unit. Each of the channels 50 may include a low noise amplifier 54 and a bandpass filter 56 which provides the received signal to a mixer 58 which mixes the received signal with a locally generated signal 60. The mixed signal may then be amplified by an intermediate frequency amplifier 62, further filtered by a bandpass filter 64 and adjusted by a gain control circuit 66. The mixed signal may then be applied to a quadrature downconverter which down converts the mixed signal to baseband. The baseband signal may be converted by an analog-to-digital ("A/D") converter 70 to a digital signal which is supplied to a digital signal processor ("DSP") 72. The DSP 72 may be under the control of a small logic device, such as a personal computer 74, which determines the angle and direction of the remote transmitter from the DSP and provides and appropriate display or announcement to a user (not shown).

In the preferred embodiment, it has been found advantageous for the remote transmitter to transmit a signal having two portions, the first portion being a preamble which alerts the base station that the signal is arriving and indicates to the receiver that it should begin receiving. The second portion of the transmitted signal may be a chirp waveform, i.e., a waveform in which the frequency is varied, usually at a linear rate, for a period of time. The transmitted signal may be generated remotely at the transmitter or may be a replay of a signal originally sent by the base station.

Use of a chirp waveform has several advantages in the present invention because of a useful property of mixed chirp signals. It is known that if two identical chirp signals, one time delayed from the other, are mixed, the resulting signal will be a sinusoidal signal with a frequency which is directly proportional to the amount of delay between the two signals.

In operation, when the transmitted signal is received at the base station, it is detected by the receiver which recognizes the preamble and starts a chirp generator 76 which modulates a quadrature modulator 78 to provide an RF chirp signal as the locally generated signal 60 on the mixer input. When the RF chirp signal is mixed with the chirp signals arriving from the remote transmitter (i.e., several time delayed versions of the transmitted chirp signal), a set of sinusoidal signals is generated whose frequencies are proportional to the time they arrived. Thus, after the mixing, the signals in each channel represent the multipath profile of the received signal in the frequency domain. In the present invention, the mixing is accomplished at an intermediate frequency and then the frequency spectrum of signals is further downconverted by the quadrature downconverter 68 to baseband. The quadrature modulator 68 may be provided with a modulating/downconverting signal from the Timing and Frequency Synthesizer 40 via a line 42 in a conventional fashion. The signal may then be digitized by the A/D converter and the digitized form of the signal applied to a multichannel DSP 72 which may use conventional techniques (such as a fast Fourier Transform) to determine the spectrum of frequencies at which signal energy is significantly present so that a power level profile may be developed. The PC 74 may review the power level profiles developed by the DSP for all the channels 50 to determine which signal arrived first. Because the relative phase relationships among the signals have been preserved and the PC 74 has been provided with the geometric relationships between the various channels, the PC 74 may conventionally determine the angle of arrival of the first arriving signal.

The filtering and amplifying elements of the DF unit of FIG. 4 may be conventional. The DSP 72 may be a commercially available device such as the TMS 320 C 30 device sold by Texas Instruments.

While not critical to the invention, in one embodiment, an acceptable signal from the transmitter had a center frequency of 915 MHz with a chirp of +/−10 MHz for a duration of approximately 10 millisec. The locally generated (reference) RF chirp used to downconvert to an intermediate frequency may be a signal having a center frequency of 880 MHz.

In the foregoing description, for ease of understanding, the elements of the system have been referred to as "base" and "remote". However, there is nothing critical to the present invention that requires one of the stations be fixed and the other mobile. Additionally, the detailed description may suggest that certain components may be utilized to construct a system of the present invention. However, that suggestion is not to be taken as limiting as it is known that many other components could be utilized to accomplish the same results. For example, the FFT 74 could be replaced by a bank of bandpass filters and appropriate detectors, each measuring the power level of the signal at different frequency ranges. Similarly, while the above description utilizes plural channels 50, the invention could be readily implemented using a single channel which is appropriately multiplexed to the various antennas.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for determining the direction with respect to a receiver of a source of a radiated radiofrequency (RF) signal, comprising the steps of:
   (a) receiving a multipath signal which has been transmitted by a remote transmitter;
   (b) correlating the received multipath signal into plural path signals;
   (c) determining the time of arrival of each of the plural path signals;
   (d) determining the direction of the remote transmitter from the path signal having the earliest determined time of arrival.

2. The method of claim 1 wherein said step of correlating comprises the step of determining the signal power level of each path signal.

3. The method of claim 1 wherein said step of receiving is accomplished by plural antennas.

4. The method of claim 3 wherein said step of receiving is accomplished by four antennas equally spaced along the corners of a square.

5. The method of claim 3 wherein said step of determining the direction comprises the step of comparing the phase relationship of the earliest arriving signal at each of the plural antennas for correspondence with predetermined angles of arrival.

6. The method of claim 1 wherein said radiated RF signal is a chirp signal.

7. The method of claim 1 wherein said radiated RF signal is derived from an RF signal received at the remote transmitter.

8. The method of claim 1 wherein step of determining the time of arrival further comprises the steps of:
   (c)(1) mixing the plural path signals with a predetermined mixing signal to produced plural mixed signals; and,
   (c)(2) calculating the time of arrival of the plural mixed signals.

9. The method of claim 8 wherein said calculated time of arrival for each mixed signal is related to the frequency of each mixed signal.

10. The method of claim 8 wherein said mixing signal is a chirp signal.

11. A system for determining the direction from which a received multipath signal was transmitted, comprising:
   plural receiving channels, each channel comprising:
      RF signal receiving means for receiving a RF signal and converting said RF signal to a received signal;
      bandpass filtering means for filtering said received signal;
      a chirp mixer to mix the filtered electrical signal with a chirp signal to produce an intermediate frequency ("IF") signal;
      IF filtering means for filtering said IF signal;
      a quadrature downconverter to downconvert said filtered IF signal to baseband quadrature signals; and,
      an analog-to-digital converter to convert the baseband quadrature signals to digital signals;
   digital signal processing means operatively connected to receive and determine the power spectrum of each of said digital signals from said plural receiving channels;
   control means for determining the time of arrival of each of said digital signals and for determining the angle of arrival of the digital signal having the earliest time of arrival.

12. A method for determining the distance between a receiver of a radiated radiofrequency (RF) signal and a transmitter of said signal, comprising the steps of:
   (a) receiving a multipath signal which has been transmitted by a remote transmitter;
   (b) correlating the received multipath signal into plural path signals;
   (c) determining the time of arrival of each of the plural path signals;
   (d) determining the distance of the remote transmitter from the path signal having the earliest determined time of arrival.

13. The method of claim 12 wherein said step of correlating comprises the step of determining the signal power level of each path signal.

14. The method of claim 12 wherein said distance determining step comprises a measurement of the time period for the signal to travel from the transmitter to the receiver.

15. The method of claim 14 wherein said receiving step comprises the steps of:
   (a) transmitting an outward signal to the remote transmitter; and,
   (b) transmitting a signal to the receiver responsively to the receipt at the transmitter of the outward signal.

16. The method of claim 12 wherein said multipath signal is a spread spectrum signal.

17. A system for determining the direction to a remote transmitter from which a chirp signal was transmitted, comprising:
   a receiver for receiving a first chirp signal and any multipath chirp signals related thereto;
   a chirp generator for providing a locally generated chirp signal;
   a mixer for combining the locally generated chirp signal with each of the received chirp signals to generate plural sinusoidal signals whose frequencies are related to the arrival times of the received chirp signals;
   a signal processor operatively connected to receive the sinusoidal signals and for determining a power spectrum of the sinusoidal signals; and
   a control means for determining from the power spectrum the relative times of arrival of the received chirp signals and for determining the angle of arrival of one of the received chirp signals having the earliest time of arrival.

18. The system of claim 17 further comprising a transmitter for transmitting an outgoing triggering signal to the remote transmitter causing the remote transmitter to transmit the first chirp signal.

19. The system of claim 18 wherein the outgoing triggering signal is a further chirp signal and the first chirp signal transmitted by the remote transmitter is a replay of the further chirp signal.

20. The system of claim 18 further comprising a timer for determining elapsed time between transmission of the triggering signal and reception of the earliest one of the received chirp signals.

21. A method of determining the direction to a remote transmitter of an RF chirp signal, comprising the steps of:
   (a) receiving plural RF chirp signals resulting from a remotely transmitted RF chirp signal;
   (b) generating a local RF chirp signal;
   (c) mixing the local RF chirp signal with each of the received RF chirp signals to generate a set of sinusoidal signals whose frequencies are related to the arrival times of the received chirp signals;
   (d) correlating the sinusoidal signals into plural path signals;
   (e) determining which one of the plural path signals arrives first; and
   (f) determining the direction to the remote transmitter using the earliest arriving one of the plural path signals.

22. The method of claim 21 wherein the step of correlating comprises the steps of determining a spectrum of frequencies with signal energy present, and developing a power level profile.

23. The method of claim 21 wherein the step of determining the earliest arriving one of the path signals comprises the step of comparing the frequencies of the sinusoidal signals.

24. The method of claim 21 wherein the transmitted RF chirp signal is transmitted in response to a trigger signal received at the remote transmitter.

25. The method of claim 24 wherein the trigger signal received at the remote transmitter is an RF chirp signal.

26. A method of determining the distance to a remote transmitter of an RF chirp signal, comprising the steps of:
   (a) receiving a multipath RF chirp signal resulting from the remotely transmitted signal;
   (b) correlating the multipath RF chirp signal into plural path signals;
   (c) determining the time of arrival of the first arrived one of the path signals; and
   (d) determining the distance of the remote transmitter using the first arrived one of the path signals.

27. The system of claim 11 further comprising a transmitter for transmitting a trigger signal to a remote transmitter to initiate transmission of the signal received at said plural receiving channels.

28. The system of claim 27 wherein said trigger signal is a chirp signal.

29. The system of claim 11 wherein the received RF signal comprises a preamble portion and a following chirp waveform portion, and wherein said RF signal receiving means is activated upon receipt of the preamble portion of the received RF signal.

30. The system of claim 17 wherein the received first chirp signal comprises a preamble portion for activating said receiver and a following chirp waveform portion.

31. The method of claim 21 wherein each of the received plural RF chirp signals comprises a preamble portion for activating a receiver and a following chirp waveform portion.

32. The method of claim 26 wherein the received RF chirp signal comprises a preamble portion for activating a receiver and a following chirp waveform portion.

* * * * *

Disclaimer

5,687,196 - James Arthur Proctor, Jr., Indialantic; James Carl Otto, Indian Harbour Beach, both of Fla. RANGE AND BEARING TRACKING SYSTEM WITH MULTIPATH REJECTION. Patent dated November 11, 1997. Disclaimer filed February 19, 2016, by the inventors.

I hereby disclaim the following complete claims 12-14 and 16 of said patent.

*(Official Gazette, September 6, 2022)*

(12) INTER PARTES REVIEW CERTIFICATE (278th)
United States Patent
Proctor, Jr. et al.

(10) Number: US 5,687,196 K1
(45) Certificate Issued: Feb. 1, 2018

(54) RANGE AND BEARING TRACKING SYSTEM WITH MULTIPATH REJECTION

(75) Inventors: James A. Proctor, Jr.; James C. Otto

(73) Assignee: ORLANDO COMMUNICATIONS LLC

Trial Number:

IPR2015-01567 filed Jul. 16, 2015

Inter Partes Review Certificate for:

Patent No.: 5,687,196
Issued: Nov. 11, 1997
Appl. No.: 08/315,345
Filed: Sep. 30, 1994

The results of IPR2015-01567 are reflected in this inter partes review certificate under 35 U.S.C. 318(b).

INTER PARTES REVIEW CERTIFICATE
U.S. Patent 5,687,196 K1
Trial No. IPR2015-01567
Certificate Issued Feb. 1, 2018

AS A RESULT OF THE INTER PARTES REVIEW PROCEEDING, IT HAS BEEN DETERMINED THAT:

Claims 12-14 and 16 are cancelled.

* * * * *